March 9, 1954     A. F. ALLEN     2,671,638
SAFETY DEVICE

Filed April 8, 1952     3 Sheets-Sheet 1

INVENTOR
ARTHUR F. ALLEN
BY John W. Michael
ATTORNEY

INVENTOR
ARTHUR F. ALLEN
BY John W. Michael
ATTORNEY

March 9, 1954 — A. F. ALLEN — 2,671,638
SAFETY DEVICE
Filed April 8, 1952 — 3 Sheets-Sheet 3

INVENTOR
ARTHUR F. ALLEN
BY John W. Michael
ATTORNEY

Patented Mar. 9, 1954

2,671,638

UNITED STATES PATENT OFFICE 2,671,638

SAFETY DEVICE

Arthur F. Allen, Milwaukee, Wis., assignor to Safway Steel Products, Inc., Milwaukee, Wis., a corporation of Wisconsin Application April 8, 1952, Serial No. 281,123

7 Claims. (Cl. 254—143)

This invention relates to a safety device for preventing collapsing of telescopic, cable interconnected members upon cable failure. This device is particularly adapted for use in a telescopic tower of the type shown in the Anderson et al. application Ser. No. 150,282, assigned to applicant's assignee, but may be used in other instances.

The Anderson et al. application shows a telescopic tower in which nested tubular sections may be telescoped relative to each other under control of an operator on a platform elevated and lowered by the telescopic movement. In that application the safety device constitutes an air ram which did not check descent as rapidly as desired when a cable broke. The present safety device constitutes an improvement over the air ram mechanism in that it is faster acting and positive in its arresting motion.

The principal object of this invention is to provide a completely safe, fast-acting, safety device for preventing movement of one tube with respect to another to which it is connected by means of a cable upon failure of the cable.

Another object of this invention is to provide a telescopic tower which is completely safe under normal and abnormal conditions.

Other objects and advantages will be pointed out in, or be apparent from, the specification and claims, as will obvious modifications of the single embodiment shown in the drawings in which:

Figure 2:
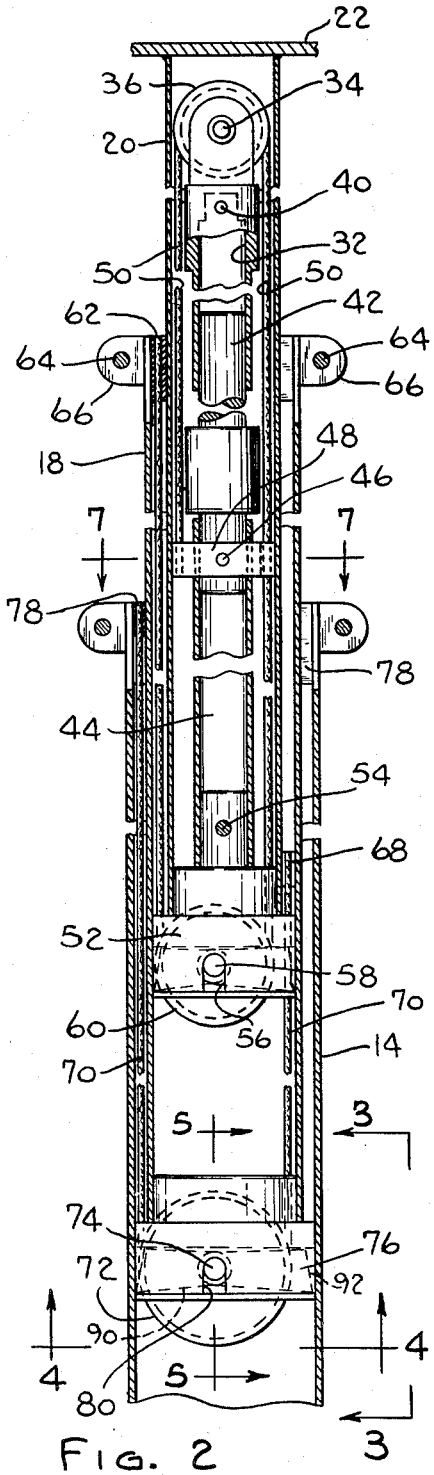
Fig. 2 is a vertical section of the telescopic column.
Figure 1:
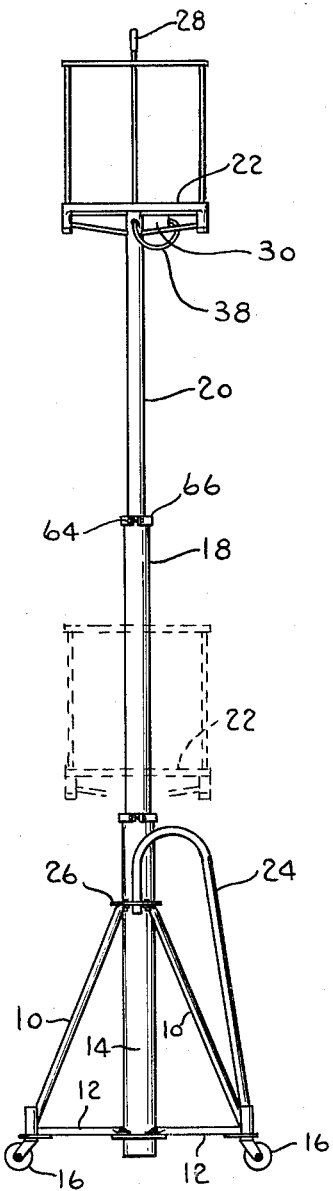
Fig. 1 is an elevation showing the telescopic tower.
Figure 3:
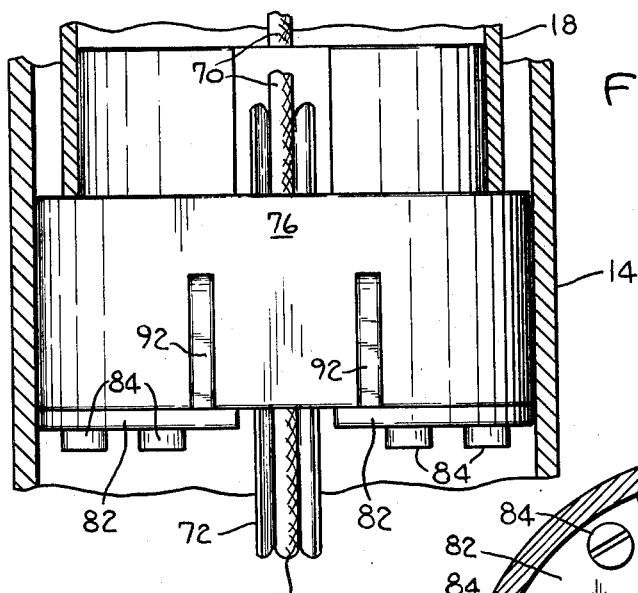
Fig. 3 is an elevation, partly in section, of a sheave block as viewed from line 3—3 in Fig. 2.
Figure 4:
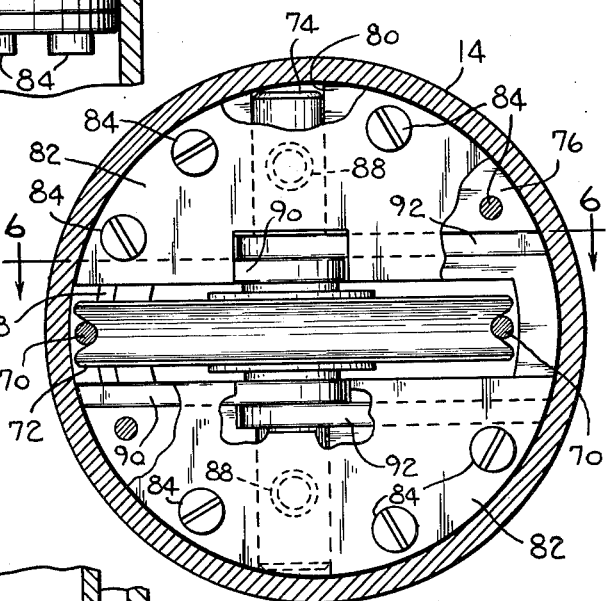
Figure 5:
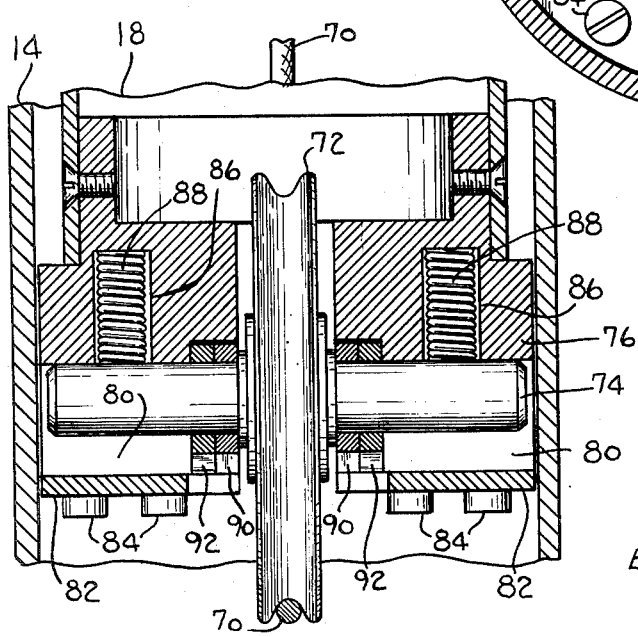
Figure 6:
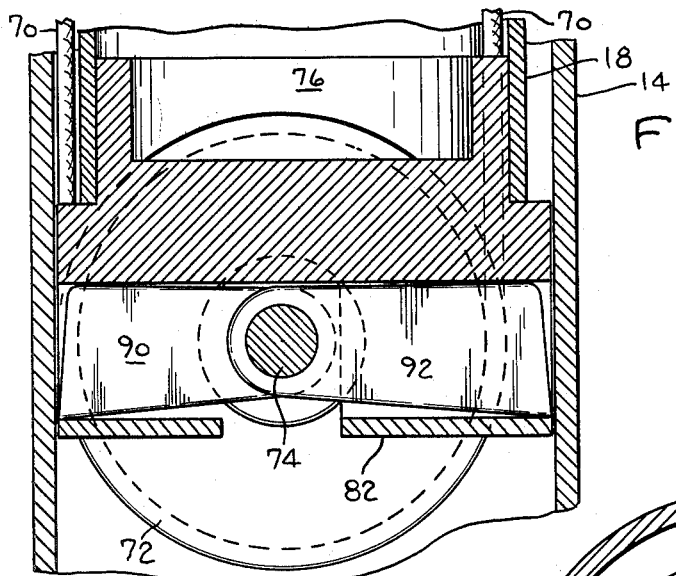
Figure 7:
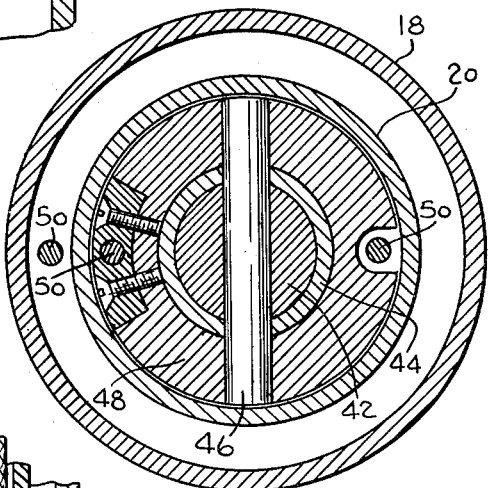

Figs. 4 and 5 are sections taken as indicated by lines 4—4 and 5—5, respectively, on Fig. 2;

Fig. 6 is a section taken as indicated by line 6—6 on Fig. 4;

Fig. 7 is a section of Fig. 2 taken on line 7—7; and

Figure 8:
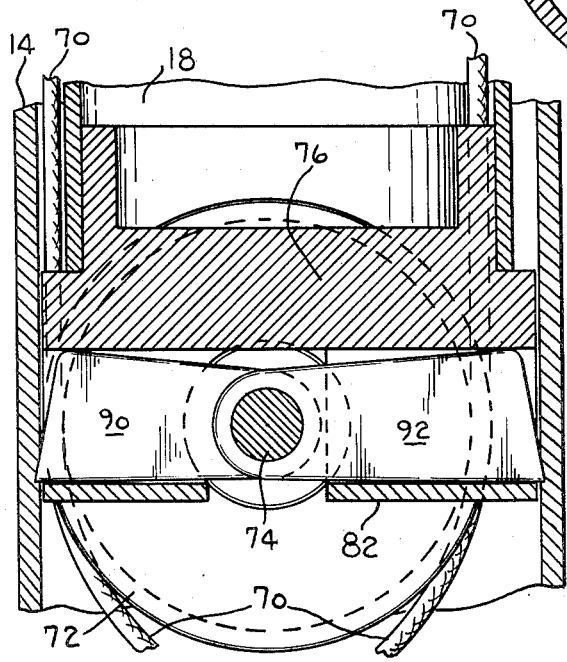

Fig. 8 is a section similar to Fig. 6 but shows the dogs in operation.

Referring to the drawings in detail, the base of the telescopic tower comprises four legs each including struts 10, 12 pivotally connected to central tube 14 and provided with caster wheels 16. Reference to the Anderson et al. application will give further details as to the construction of these legs and the manner in which they may be pivoted with respect to tube 14 to permit the tower to pass through a narrow opening. Tube 14 comprises the lower or bottom section of a telescopic tower which includes coaxial nested tubes 18, 20. A work platform 22 is secured to the top of the upper tube 20. When the column is collapsed access to the platform may be conveniently had by means of ladder 24 removably secured to the upper tube collar 26 and seated on the base assembly by means of U-shaped saddles or the like.

A person standing on the platform 22 can readily raise or lower the platform by actuating lever 28 which operates a pump in housing 30 to regulate fluid flow to and from a hydraulic ram. The ram includes a cylinder 32 fixed in upper tube 20 by means of its connection to trunnion 34 which also serves as the axle for sheave 36. Oil flow from the pump and housing 30 passes through flexible conduit or hose 38 into hole 40 in the upper end of the cylinder to force the piston or ram 42 downwardly. Spacer tube 44 is connected to the lower end of ram 42 by means of pin 46 which is also connected to anchor 48 for cable 50. A guide and pulley block 52 is connected to the lower end of spacer tube 44 by means of bolt 54. This block is adapted to slide in the middle tube 18 to guide the lower end of the ram. Block 52 is provided with an elongated notch 56 at diametrically opposed points to receive the ends of axle 58 of sheave 60. Cable 50 is reeved from anchor 48 over pulleys 36, 60, and up to an anchor and bearing block 62 carried by middle tube 18. Since the cable passes inside tube 20 on the right (Fig. 2) and between tubes 18 and 20 on the left of pulley 60, the sheave axle 68 is off center with respect to the tubes to prevent chafing the cable on the tube ends.

As may be seen in Fig. 2, the upper end of middle tube 18 is split and the cable anchor is also split to permit taking up manufacturing errors by simply tightening bolts 64 to draw up on U-shaped clamps 66 and close the bearing on the upper tube. A bearing member 68 is fixed to the lower end of tube 20 to slide inside tube 18 and guide the bottom of the upper tube. Tube 18 is supported and guided in lower tube 14. The upper end of the bottom tube 14 is split and provided with clamps in the same manner as described above. The lower tube also is provided with a cable 70 which is reeved over a pulley 72 rotatable on axle 74 in bearing block 76 secured to the lower end of tube 18. Since cable 70 passes upwardly inside the middle tube 18 through a cooperating slot in block 52 to its anchor in bearing 68 (fixed to tube 20) axle 74 is offset as in the case of axle 58. Therefore the middle tube 18 is guided by bearing 78 at the top of the bottom or outer tube and by bearing block 76. With this construction and with the adjustability afforded by the split tube described above the tower can be maintained stable when fully extended and throughout its life.

When oil is pumped into the hydraulic ram, downward movement of piston 42 causes the cable anchor 48 and sheave 60 to move away from the cylinder 32. Considering sheave 60 to be fixed in space for the moment, it will be appreciated that one inch of ram extension will cause tube 20 to rise one inch with respect to sheave 60. In order to move the ram one inch the cable anchor 48 must move one inch causing two inches of cable to be taken up. Now considering sheave 60 to be free, as it actually is, it will be noted that the two inches of cable necessary for the ram movement can be obtained only by raising the sheave two inches since cable 50 is anchored in bearing 62. Raising sheave 60 two inches necessarily raises the upper tube 20 two inches. Therefore one inch of ram movement causes the upper tube 20 to move a total of three inches (one plus two) with respect to the middle tube 18.

The same linear movement is transmitted to the middle tube by means of cable 70 which is anchored to the upper tube at bearing 68 and to the lower tube at bearing 78. Therefore when the upper tube moves three inches with respect to the middle tube the middle tube moves three inches wih respect to the lower tube. It will be apparent, therefore, that one inch of ram move-move moves the upper tube three inches with respect to the middle tube and the middle tube three inches with respect to the bottom tube to raise the platform a total of six inches. Therefore, a twenty-inch ram stroke can be employed to raise the platform ten feet, for example. The platform may be lowered by opening a conventional valve mechanism to bleed hydraulic fluid from the ram to the sump through a restricted opening the size of which will determine the rate of descent.

Sheave and bearing blocks 52 and 76 are each provided with similar safety apparatus to prevent collapsing movement of the tower in the event one of the cables should break. The following description relates to sheave and bearing block 76 but it will be understood that the same construction is incorporated in block 52. Referring to block 76 in detail it will be noted that the sheave axle 74 is mounted in an elongated slot 80 which is closed at its lower end by an end plate 82 connected to the underside of the block by means of screws 84 to thus define an elongated opening in which the sheave axle may move vertically. The block is provided with bored wells 86 on each side of the sheave to receive compressed springs 88 which act on the sheave axle in a downward direction. With the cables reeved as noted above the tension due to the weight of the tower itself is sufficient to overcome the bias of springs 88 and raise the sheave and its axle to the position shown in Figures 2, 5, and 6. If the cable tension were relieved springs 88 would drive the axle downwardly. Pairs of generally diametrically opposed dogs 90, 92 are mounted on either side of the sheave and normally occupy the position as shown in Fig. 6 wherein the ends of the dogs barely clear the inside of the next outer tube. If cable 70 should break the release of tension will allow springs 88 to drive the axle downwardly and thus force the toggle-acting dogs 90, 92 outwardly to bite into the relatively soft material of the next outer tube and thus positively lock the tubes with respect to each other. It will readily be appreciated that if cable 70 should break, only the dogs associated with the lower sheave and bearing block 78 would move into operation. It will be noted that the tower cannot collapse after the dogs have moved into position and the operator on the platform would necessarily be forced to resort to other means to effect his descent. The tower must be taken apart to replace the cable and this insures against temporary and dangerous makeshift repairs. The tower will drop free approximately three-quarters of an inch before the safety device takes over and prevents further movement.

It will be noted that dogs 90, 92 on each side of the sheave axle do not stress the axle except in shear and the axle may be designed to withstand considerable shear without adverse effect. The slight burr raised on the inside of the tube as the result of the dogs biting into the tube is readily smoothed off by the motion of the tubes with respect to each other upon being replaced in operation.

Keyways (not shown) are provided to prevent rotation of the tower about its axis and insure complete stability of the apparatus. While the present device is shown as being hand-powered it will be appreciated that the pump could be motor (gasoline or electric) driven.

As used in the claims, "tube" is intended to cover structures having non-circular cross-sections.

Although but one embodiment of the present invention has been illustrated and described, it will be apparent to those skilled in the art that various changes and modifications may be made therein without departing from the spirit of the invention or from the scope of the appended claims.

I claim:

1. The combination with normally vertically disposed nested tubes adapted for telescopic movement with respect to each other and interconnected by means of a cable which passes over a sheave carried by the inner tube, of safety means for preventing movement of the inner tube with respect to the outer tube in the event of failure of the cable, comprising, a block, an axle for the sheave mounted in the block and constrained to movement in a generally vertical plane, a spring housed within the block and compressed between the axle and the block to bias the axle to a first position, said spring being overcome by tension applied to the cable to thereby move the axle to a second position, and a toggle-acting dog pivotally mounted on said axle within the block and being inoperable when said axle is in said second position and operative when the axle is in the first position to project outwardly from the block and engage the inner wall of said outer tube.

2. The combination according to claim 1, including a second dog generally diametrically opposed to the first dog and mounted on and operated by the axle, the axle being stressed principally in shear when said dogs are in their operative positions.

3. The combination with telescopically nested tubes normally subjected to a force tending to move one of the tubes in a given direction and interconnected by means of a cable which passes over a sheave and which is tensioned to urge the sheave in a direction opposite said given direction, of safety means for preventing movement of said one tube in said given direction upon cable failure, comprising, a block carried by the inner tube, an axle for the sheave mounted in the block and constrained by the block to movement in a plane generally parallel to the axis of the tubes between first and second positions, a spring housed in said block and biasing the axle in said given direction to said first position, the cable tension being operable to overcome said spring to move the axle to the second position, a toggle-acting dog connected to the axle and mounted in said block, said dog being inoperative when the axle is in said second position and being operative when the axle is in the first position to project from the block and engage the inner surface of the outer tube.

4. Safety apparatus comprising a tube, a block slidable within the tube, an axle mounted in the block, a sheave on the axle, a spring housed in said block and compressed between the block and axle to bias the axle from a first position to a second position, a cable normally reeved on the sheave and tensioned to overcome said spring to move the axle from said second position to said first position, a toggle-acting dog mounted on the axle within said block and being inoperative when the axle is in said first position and operative to project from the block to engage the inner wall of the tube when the axle is in the second position, said spring being operative to move the axle to said second position upon failure of the tension in the cable.

5. Apparatus according to claim 4 including a second toggle-acting dog mounted on said axle and operative when the axle is in said second position to engage the inner wall of said tube at a point generally opposed to the point of engagement between the first mentioned dog and the inner wall of the tube, said dogs acting to stress the axle in shear when the dogs are in their operative positions.

6. A safety device comprising, a block provided with diametrically opposed elongated slots, an axle mounted in said slots constrained thereby to movement between first and second positions, a sheave mounted on the axle, a compressed spring mounted within said block and biasing the axle to said second position, and a toggle-acting dog mounted on the axle within the block and operative when the axle is in said second position to project from the block in a manner to engage a surface surrounding the block and being inoperative and contained within the block when the axle is in said first position, said spring being normally overcome by a force applied to the sheave.

7. Safety apparatus comprising a tube, a block slidable within the tube, an axle mounted in the block, a sheave mounted on the axle, said axle being mounted in elongated slots in the block operable to constrain the axle to movement between first and second positions, a spring compressed between the block and axle and biasing the axle to said second position, said sheave normally being stressed to overcome said spring, and normally inoperative means responsive to movement of the axle to said second position to engage the inner wall of the tube.

ARTHUR F. ALLEN.

References Cited in the file of this patent
UNITED STATES PATENTS

| Number | Name | Date |
| --- | --- | --- |
| 1,015,137 | Clark | Jan. 16, 1912 |
| 2,128,712 | Neff | Aug. 30, 1938 |